March 24, 1925.
I. L. AKIN
1,530,801
TRANSMISSION LOCK FOR MOTOR VEHICLES
Filed Oct. 17, 1923
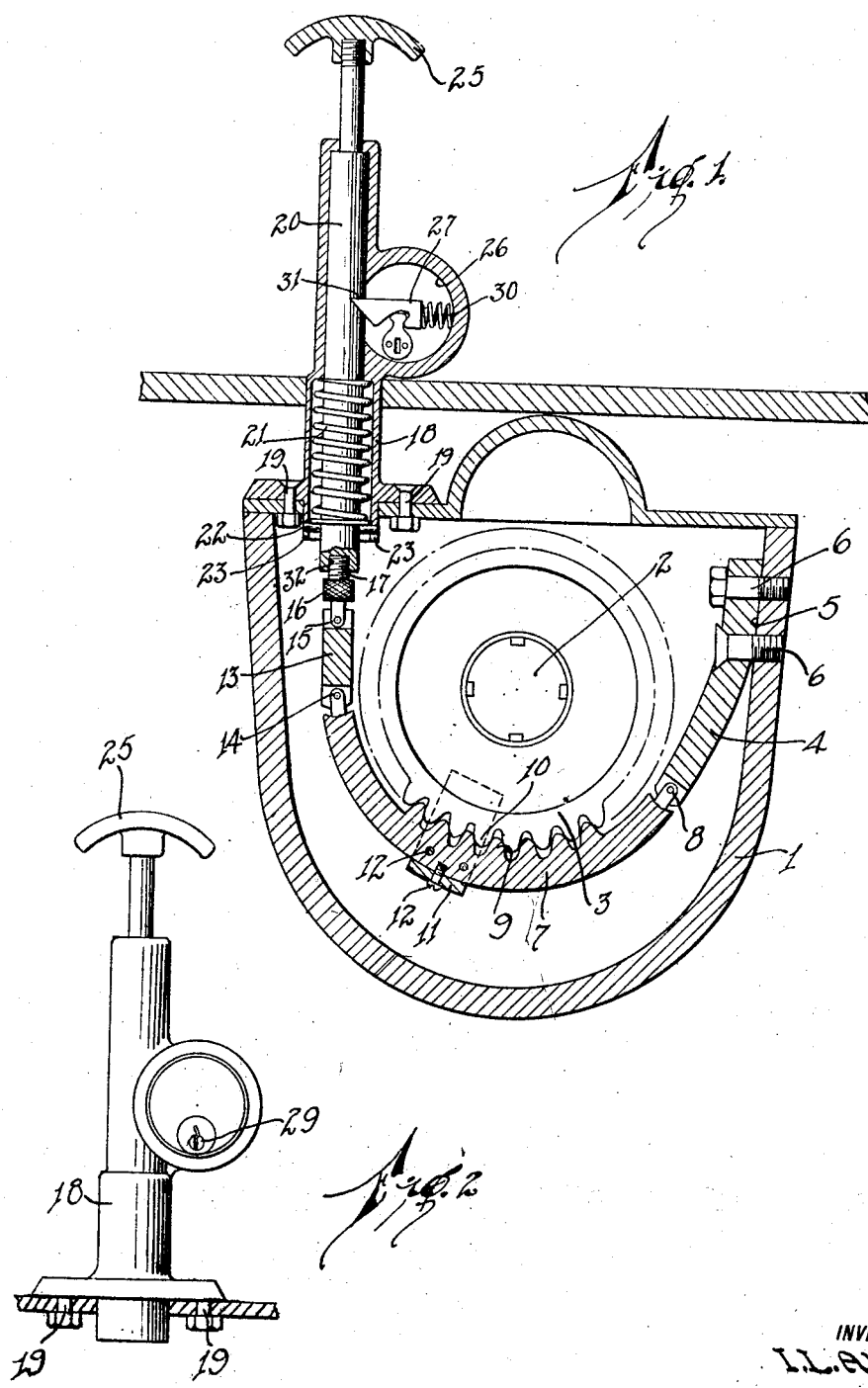
INVENTOR
I.L. Akin
BY
ATTORNEYS Patented Mar. 24, 1925.

1,530,801

UNITED STATES PATENT OFFICE.

IRVIN LANCASTER AKIN, OF OKLAHOMA CITY, OKLAHOMA.

TRANSMISSION LOCK FOR MOTOR VEHICLES.

Application filed October 17, 1923. Serial No. 669,153.

*To all whom it may concern:*

Be it known that I, IRVIN LANCASTER AKIN, a citizen of the United States, and a resident of Oklahoma City, in the county of Oklahoma and State of Oklahoma, have invented a new and useful Improvement in Transmission Locks for Motor Vehicles, of which the following is a full, clear, and exact description.

My invention relates to improvements in transmission locks for motor vehicles, and it consists in the combinations, constructions, and arrangements herein described and claimed.

An object of my invention is to provide a transmission lock of the character described by means of which the vehicle may not be driven nor towed away. With the ordinary type of steering wheel lock or ignition lock, it is possible to tow the motor vehicle away by lifting the fore wheels from the road and towing the vehicle with only the rear wheels on the ground. This could not be carried out with a motor vehicle equipped with my improved transmission lock.

A further object of my invention is to provide a transmission lock of the character described in which all possibility of the lock making engagement with the transmission unintentionally while the vehicle is in motion is precluded. This is an important improvement, since if the lock should become engaged while the vehicle is in motion, great damage would be brought about in the transmission gears as well as the differential shaft.

A further object of my invention is to provide a transmission lock of the character described in which the locking member may be brought into effective engagement with the principal gear wheel of the transmission by merely elevating the draw lever disposed adjacent the speed control lever of the motor vehicle.

A further object of my invention is to provide a device of the type described in which any shifting of the gears when the lock is in operative position is precluded.

A further object of my invention is to provide a transmission lock of the character described which may be easily applied to the ordinary type of transmission without necessitating the reconstruction of any of the parts thereof.

A further object of my invention is to provide a transmission lock of the character described which is simple in construction, durable, and thoroughly efficient for the purpose intended.

Other objects and advantages will appear in the following specification, and the novel features of the invention will be particularly pointed out in the appended claims.

My invention is illustrated in the accompanying drawings forming part of this application, in which—

Figure 1 is a sectional view of an embodiment of my invention operatively applied to the transmission of a motor vehicle, and Figure 2 is a side elevation of a portion of the mechanism illustrated in Figure 1.

In carrying out my invention I make use of a motor vehicle having a transmission casing 1 in which a plurality of gears are disposed and arranged for manual operation for the controlling of power transmitted from the engine shaft to a differential shaft 2 of a motor vehicle. A low and reverse speed gear 3 is feathered upon the differential shaft 2 so that the gear 3 must turn therewith. This gear 3 is the only gear employed as a cooperating part of my improved transmission lock.

A steel strap or hanger 4 is securely fixed on the inner wall 5 of the transmission casing 1 by means of screws 6, which screws are disposed with their heads on the inner side of the casing so that they may not be removed by external manipulation.

An arcuate locking member 7 is hingedly mounted upon the hanger 4 at 8. The curve in the arcuate member 7 is substantially concentric with the peripheral edge of the gear 3 as shown in Figure 1. This locking member is provided with a plurality of gear teeth 9 on the inner wall thereof arranged to accurately register with the spaces between the gear teeth 10 and the gear 3.

A U-shaped member 11 is fixed by means of rivets 12 so as to straddle the locking member 7 and to permit the parallel portions thereof to engage with the side walls of the gear 3, thereby precluding movement of the gear on the shaft 2. This element 11 is for the purpose of preventing manual shifting of the gear 3 when the lock is in effective operation so that the gear may not be moved out of registration with the teeth 9 and thereby permit towing of the vehicle or moving of the vehicle under its own power in a higher speed.

The steel link 13 is pivotally mounted at 14 at the opposite end of the member 7. This link 13 has pivotally connected thereto at 15 a member 16 provided with external threads 17 at the outer end thereof.

A vertically extending tubular casing 18, secured to the transmission casing 1 by means of bolts 19, is provided for the purpose of partially housing a draw rod 20 by means of which the locking member 7 may be manually drawn into engagement with the gear 32.

A compression spring 21 mounted concentric with the draw rod 20 and disposed within the casing 18, is provided for the purpose of normally maintaining the draw rod 20 in a lowered position so that the locking member 7 is out of engagement with the gear 3. In order to cause engagement of the locking member 7 with the gear 3, it is necessary to oppose the force of the spring 21.

The pin 22 is projected through the draw rod 20 and serves a dual purpose, first, to retain the lower end of the spring against movement relative to the draw rod, and second, to prevent the rotation of the draw rod 20 when in an elevated position, (see Figure 1). This is brought about by the provision of recesses 23, diametrically opposed, at the lower end of the tubular casing 18 in which the pin 22 may set when the rod is elevated.

The draw rod 20 is provided with a hand grip 25 at the upper end thereof by means of which manual movement of the rod is facilitated. The tubular casing 18 has an integral compartment 26 formed on one side wall thereof in which a locking mechanism comprising a latch 27 and a cam 28 operated by a key projected through the key slot 29 is disposed. Movement of the cam 28 by means of a suitable key provided to extend to the slide 29 causes the draw bolt 27 to move against the action of a spring 30 and thereby out of engagement with the recess 31 provided in the side walls of the draw rod 20.

From the foregoing description of the various parts of the device, the operation thereof may be readily understood. In applying my improved transmission lock to the ordinary type of transmission, it is merely necessary to remove the transmission cover to fix the casing 18 in place as shown in Figure 1 and to secure the hanger 4 by means of the machine screws 6 to the inner wall of the transmission casing. The bolt 20 will thereupon be engaged with the threaded portion 23 of the member 16 by means of the interiorly threaded socket 32 at the lower end thereof, and the lock is assembled and ready for use.

When it is desired to lock the motor vehicle so that it may not be moved nor driven by others, it is merely necessary to elevate manually the bolt 20 by means of the hand grip 25 against the action of the spring 21 so that the locking member 7 may engage with the gear teeth. Any successful attempt to tow the car will thus be prevented, since the differential shaft must move if the gear wheels turn, and obviously motion of the differential shaft is stopped. An attempt to drive the car by shifting the gears will be entirely precluded since the gear 3 will be stopped from lateral movement on the shaft 2 by means of the U-shaped member 11. In order to unlock the vehicle so that it may be driven, it is merely necessary to insert a key properly provided, through the slot 29, to turn the key, causing movement of the cam 28, and the drawing of the bolt 27 out of engagement with the draw bolt 20. The force of the spring 21 will occasion a downward movement of the locking member 7 and thus disengage the locking member 7 and the gear 3.

I claim:

1. The combination with a motor vehicle transmission, having a drive shaft and a gear arranged to turn with said drive shaft, of a locking member having the contour of a segmental gear, said locking member being disposed beneath said gear, normally free of the teeth thereof, a plunger connected with said locking member, whereby said locking member may be drawn upwardly into engagement with the teeth of said gear, and a spring for yieldingly maintaining said plunger in a retracted position.

2. The combination with a motor vehicle transmission, having a drive shaft and a gear arranged to turn with said drive shaft, of a locking member having the contour of a segmental gear, said locking member being disposed beneath said gear, normally free of the teeth thereof, a plunger connected with said locking member, whereby said locking member may be drawn upwardly into engagement with the teeth of said gear, a spring for yieldingly maintaining said plunger in a retracted position, and a key actuated lock for locking said plunger in an elevated position against the action of said spring, whereby said locking member may be held in engagement with the teeth of said gear.

IRVIN LANCASTER AKIN.